(12) United States Patent
Hsieh et al.

(10) Patent No.: US 12,515,220 B2
(45) Date of Patent: *Jan. 6, 2026

(54) BIO-CHIP, BIO-DETECTION SYSTEM AND BIO-DETECTION METHOD

(71) Applicant: VisEra Technologies Company Limited, Hsin-Chu (TW)

(72) Inventors: Hsin-Yi Hsieh, Hsin-Chu (TW); Lai-Hung Lai, Hsin-Chu (TW)

(73) Assignee: VISERA TECHNOLOGIES COMPANY LIMITED, Hsin-Chu (TW)

( * ) Notice: Subject to any disclaimer, the term of this patent is extended or adjusted under 35 U.S.C. 154(b) by 854 days.

This patent is subject to a terminal disclaimer.

(21) Appl. No.: 17/858,582

(22) Filed: Jul. 6, 2022

(65) Prior Publication Data

US 2024/0009664 A1 Jan. 11, 2024

(51) Int. Cl.
*G01N 21/64* (2006.01)
*B01L 3/00* (2006.01)

(52) U.S. Cl.
CPC ..... *B01L 3/502715* (2013.01); *B01L 3/50855* (2013.01); *G01N 21/6428* (2013.01); *G01N 21/645* (2013.01); *B01L 2200/10* (2013.01); *B01L 2300/0819* (2013.01); *B01L 2300/0896* (2013.01)

(58) Field of Classification Search
None
See application file for complete search history.

(56) References Cited

U.S. PATENT DOCUMENTS

2019/0170904 A1* 6/2019 Topolancik ........ G01N 21/6456
2019/0383738 A1* 12/2019 Sato .................... G01N 21/645

* cited by examiner

*Primary Examiner* — Rebecca M Giere

(74) *Attorney, Agent, or Firm* — MUNCY, GEISSLER, OLDS & LOWE, P.C.

(57) ABSTRACT

A bio-chip is provided. The bio-chip includes a substrate and a first organic photoelectric conversion element disposed on the substrate. The first organic photoelectric conversion element defines pixel units. The bio-chip also includes a polarizing array disposed on the first organic photoelectric conversion element. The polarizing array includes polarizing sets, each polarizing set corresponds to one pixel unit and has sub-polarizing units that have different polarizing angles. The bio-chip further includes reaction sites disposed on the polarizing array. Each reaction site corresponds to one sub-polarizing unit.

20 Claims, 8 Drawing Sheets

BIO-CHIP, BIO-DETECTION SYSTEM AND BIO-DETECTION METHOD

BACKGROUND

Technical Field

The embodiments of the present disclosure relate to bio-chips, and in particular, they relate to a bio-chip with a polarizing array and a bio-detection system with a depletion light source.

Description of the Related Art

Integrated sensing devices have recently become popular for biological analysis. When using such an application, a biological or biochemical sample may be placed on a bio-chip. The bio-reaction or interaction, such as DNA sequencing and immunofluorescence detection, may be reported through the excitation or emission spectrum and/or the intensity of a fluorescent molecule. The fluorescent molecules may be excited by an excitation light with a shorter wavelength and generate an emission light with a longer wavelength toward the photodetector. The spectrum distribution and intensity of the fluorescence may be detected and measured by the photodetector of the bio-detection system.

In the course of bio-chip evolution, the density of the array on the bio-chip has generally increased by reduction in space width or well pitch in order to pursue lower costs and achieve higher throughput. However, such reductions in array size may cause crosstalk between neighboring wells, and it may be difficult to detect each individual fluorescent signal precisely, leading to inaccurate analytical results.

Although existing bio-chips have been adequate for their intended purposes, they have not been entirely satisfactory in all respects. Therefore, a novel bio-chip accompanied by a novel bio-detection system and a novel bio-detection method is still in demand.

BRIEF SUMMARY

In some embodiments of the present disclosure, the bio-chip includes organic photoelectric conversion element, which may absorb short wavelength light, so that the organic photoelectric conversion element may be used as a filter that can partially reject the excitation light. Furthermore, the bio-detection system includes a depletion light source configured to emit a depletion light and a polarizing element configured to polarize the depletion light, which may help to selectively collect a signal from a specific reaction site (e.g., nanowell) in a group of reaction sites.

In accordance with some embodiments of the present disclosure, a bio-chip is provided. The bio-chip includes a substrate and a first organic photoelectric conversion element disposed on the substrate. The first organic photoelectric conversion element defines pixel units. The bio-chip also includes a polarizing array disposed on the first organic photoelectric conversion element. The polarizing array includes polarizing sets, each polarizing set corresponds to one pixel unit and has sub-polarizing units that have different polarizing angles. The bio-chip further includes reaction sites disposed on the polarizing array. Each reaction site corresponds to one sub-polarizing unit.

In some embodiments, the first organic photoelectric conversion element includes first bottom conductive segments disposed on the substrate, wherein the pixel units are defined by the first bottom conductive segments. The first organic photoelectric conversion element further includes a first top conductive layer disposed on the first bottom conductive segments and a first organic layer disposed between the first bottom conductive segments and the first top conductive layer, wherein a thickness of the first organic layer is greater than 500 nm.

In some embodiments, the first organic photoelectric conversion element further includes a first bottom carrier transporting layer disposed between the first bottom conductive segments and the first organic layer and a first top carrier transporting layer disposed between the first organic layer and the first top conductive layer.

In some embodiments, the bio-chip further includes a second organic photoelectric conversion element disposed between the first organic photoelectric conversion element and the polarizing array.

In some embodiments, the second organic photoelectric conversion element includes second bottom conductive segments disposed on the first top conductive layer. The second organic photoelectric conversion element further includes a second top conductive layer disposed on the second bottom conductive segments and a second organic layer disposed between the second bottom conductive segments and the second top conductive layer, wherein a thickness of the second organic layer is greater than 500 nm.

In some embodiments, the effective responsive wavelength of the second organic layer is different from the effective responsive wavelength of the first organic layer.

In some embodiments, the second organic photoelectric conversion element further includes a second bottom carrier transporting layer disposed between the second bottom conductive segments and the second organic layer and a second top carrier transporting layer disposed between the second organic layer and the second top conductive layer.

In some embodiments, the reaction sites are formed as nanowells or nanopatterns.

In some embodiments, the number of sub-polarizing units in one of the polarizing sets is n, and n is a positive integer between 2 and 25.

In some embodiments, the sub-polarizing units in one of the polarizing sets are arranged in a clockwise direction, a counterclockwise direction, or an S-shaped direction.

In some embodiments, one of the sub-polarizing units has a polarizing angle that is 180°/n shift to that of a previous one of the sub-polarizing units, and n is the number of sub-polarizing units in one of the polarizing sets.

In some embodiments, the bio-chip further includes a filter element disposed between the first organic photoelectric conversion element and the polarizing array for laser light rejection.

In some embodiments, the bio-chip further includes a planarization layer disposed between the polarizing array and the reaction sites.

In accordance with some embodiments of the present disclosure, a bio-detection system is provided. The bio-detection system includes an excitation light source and a depletion light source. The excitation light source is configured to emit an excitation light, and the depletion light source faces the excitation light source and is configured to emit a depletion light. The bio-detection system also includes the foregoing bio-chip disposed between the excitation light source and the depletion light source. The bio-chip is configured to receive the excitation light and the depletion light. The bio-detection system further includes a polarizing element disposed between the depletion light source and the bio-chip. The polarizing element is configured to polarize the depletion light.

In some embodiments, the polarizing element is a rotatable polarizing element.

In some embodiments, the bio-detection system further includes a cover plate disposed between the excitation light source and the bio-chip as a fluidic cover for a sequential flow of bioreagents.

In some embodiments, the wavelength of the depletion light is greater than or equal to 660 nm.

In some embodiments, the excitation light source emits excitation light with different wavelengths.

In accordance with some embodiments of the present disclosure, a bio-detection method is provided. The bio-detection method includes the following steps. The foregoing bio-detection system is provided. Bio-samples are immobilized on the reaction sites of the bio-chip. An excitation light is provided. A first detecting step is performed to obtain a first fluorescent signal emitted from the bio-samples. The first detecting step includes the following steps. The polarizing element is adjusted to have a first polarizing angle that is 90 degrees different from the polarizing angle of one of the sub-polarizing units. A depletion light is provided. The first fluorescent signal emitted from the bio-samples is collected.

In some embodiments, the bio-detection method includes also includes the following step. A second detecting step is performed after the first detecting step to obtain a second fluorescent signal emitted from the bio-samples. The second detecting step includes the following steps. The polarizing element is adjusted to have a second polarizing angle that is 90 degrees different from a polarizing angle of another of the sub-polarizing units. The depletion light is provided. The second fluorescent signal emitted from the bio-samples is collected. The bio-detection method includes further includes the following step. The first detecting step and the second detecting step are repeated until all designed bioreactions or bioprotocols for the bio-samples on all reaction sites have been detected.

BRIEF DESCRIPTION OF THE DRAWINGS

The disclosure can be more fully understood from the following detailed description when read with the accompanying figures. It is worth noting that, in accordance with standard practice in the industry, various features are not drawn to scale. In fact, the dimensions of the various features may be arbitrarily increased or reduced for clarity of discussion.

DETAILED DESCRIPTION

Figure 1:
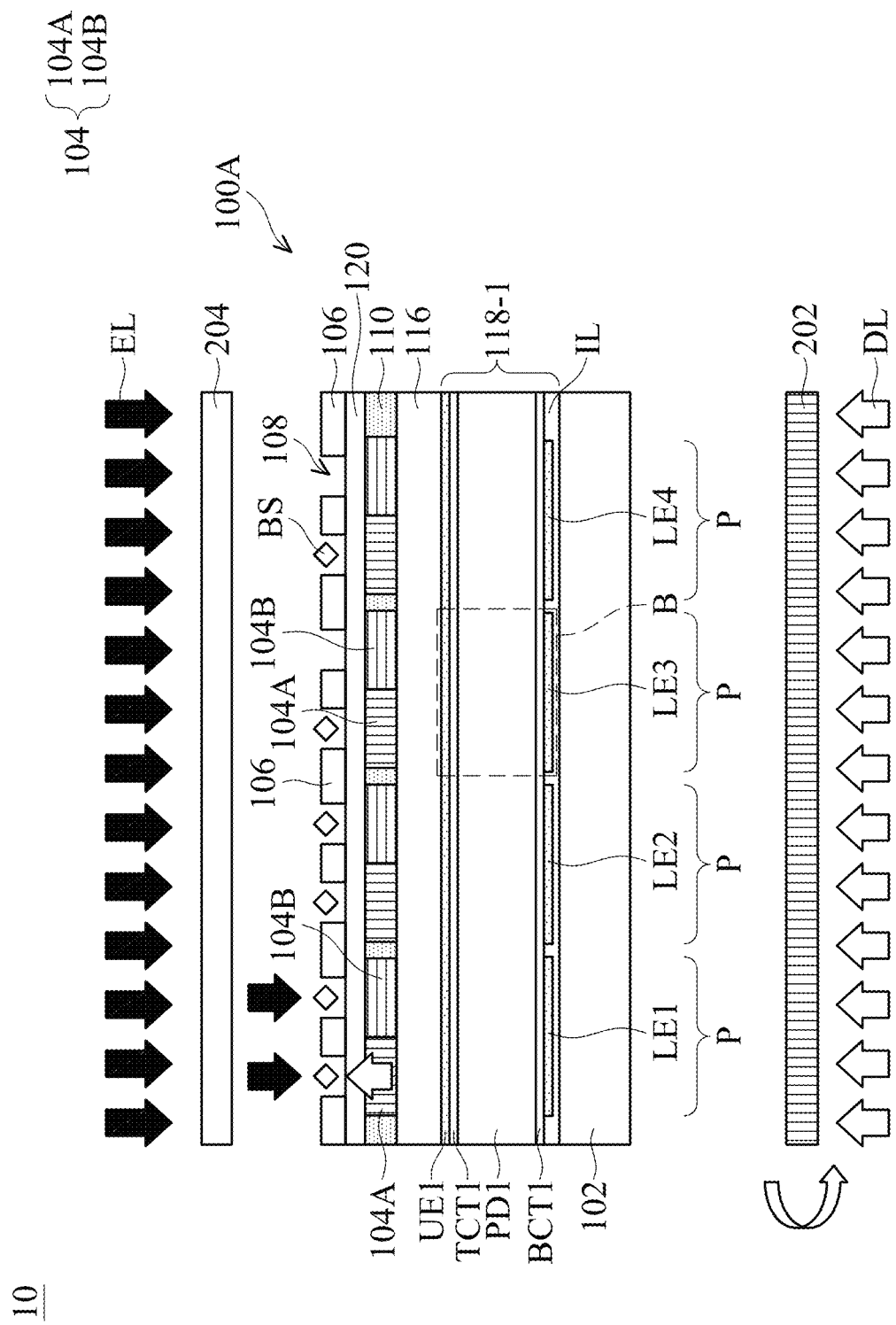
FIG. 1 is a cross-sectional view illustrating the bio-detection system according to some embodiments of the present disclosure.

The following disclosure provides many different embodiments, or examples, for implementing different features of the subject matter provided. Specific examples of components and arrangements are described below to simplify the present disclosure. These are, of course, merely examples and are not intended to be limiting. For example, a first feature is formed on a second feature in the description that follows may include embodiments in which the first feature and second feature are formed in direct contact, and may also include embodiments in which additional features may be formed between the first feature and second feature, so that the first feature and second feature may not be in direct contact.

It should be understood that additional steps may be implemented before, during, or after the illustrated methods, and some steps might be replaced or omitted in other embodiments of the illustrated methods.

Furthermore, spatially relative terms, such as "beneath," "below," "lower," "on," "above," "upper" and the like, may be used herein for ease of description to describe one element or feature's relationship to other elements or features as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In the present disclosure, the terms "about," "approximately" and "substantially" typically mean +/−20% of the stated value, more typically +/−10% of the stated value, more typically +/−5% of the stated value, more typically +/−3% of the stated value, more typically +/−2% of the stated value, more typically +/−1% of the stated value and even more typically +/−0.5% of the stated value. The stated value of the present disclosure is an approximate value. That is, when there is no specific description of the terms "about," "approximately" and "substantially", the stated value includes the meaning of "about," "approximately" or "substantially".

Unless otherwise defined, all terms (including technical and scientific terms) used herein have the same meaning as commonly understood by one of ordinary skill in the art to which this disclosure belongs. It should be understood that terms such as those defined in commonly used dictionaries should be interpreted as having a meaning that is consistent with their meaning in the context of the relevant art and will not be interpreted in an idealized or overly formal sense unless expressly so defined in the embodiments of the present disclosure.

The present disclosure may repeat reference numerals and/or letters in following embodiments. This repetition is for the purpose of simplicity and clarity and does not in itself dictate a relationship between the various embodiments and/or configurations discussed.

FIG. 1 is a cross-sectional view illustrating the bio-detection system 10 according to some embodiments of the present disclosure. It should be noted that some components of the bio-detection system 10 in FIG. 1 have been omitted for sake of brevity. Furthermore, additional features may be added to the bio-detection system 10 in accordance with some embodiments of the disclosure.

Referring to FIG. 1, in some embodiments, the bio-detection system 10 includes a bio-chip 100A. As shown in FIG. 1, in some embodiments, the bio-chip 100A includes a substrate 102. For example, the substrate 102 may include a flexible material, such as polyethylene terephthalate (PET), polysulfone (PES), polyimide (PI), polycarbonate (PC), polymethylmethacrylate (PMMA), silicone, epoxy, the like, or a combination thereof. The substrate 102 may also include a rigid material, such as a glass, a quartz, or a sapphire.

The substrate 102 may be transparent or semi-transparent. More specifically, in the embodiments where the substrate 102 is transparent, the material of the substrate 102 may have a light transmittance to light with a wavelength in a range from 400 nm to 750 nm greater than about 85%, or greater than about 92%. In the embodiments where the substrate 102 is semi-transparent, the material of the substrate 102 may have a light transmittance to light with a wavelength in a range from 400 nm to 750 nm greater than about 25% and less than about 85%, but the present disclosure is not limited thereto.

Figure 2:
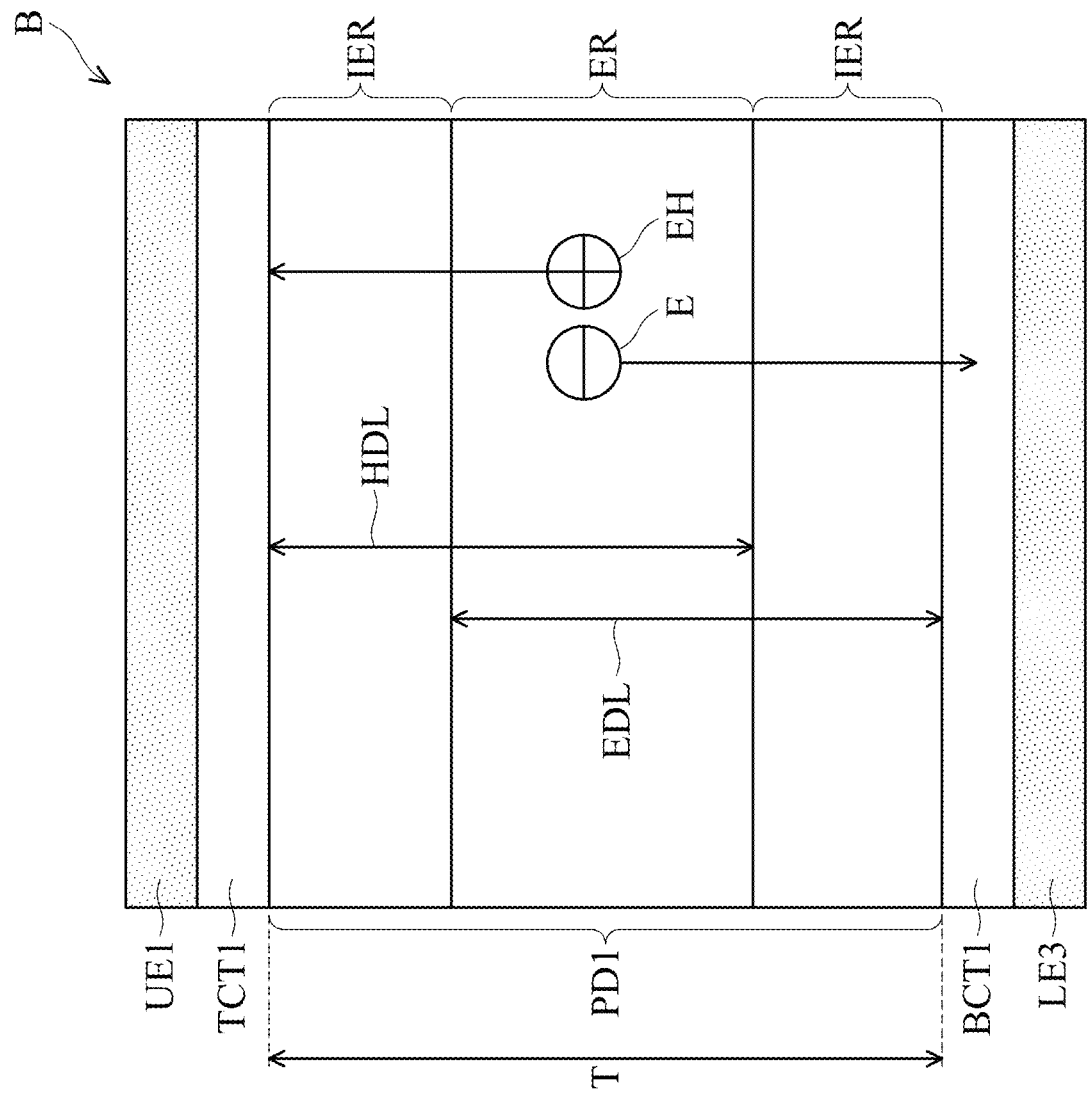
FIG. 2 is a partially enlarged cross-sectional view illustrating the organic photoelectric conversion element.

As shown in FIG. 1, in some embodiments, the bio-chip 100A includes an organic photoelectric conversion element 118-1 disposed on the substrate 102, and the organic photoelectric conversion element 118-1 define pixel units P. FIG. 2 is a partially enlarged cross-sectional view illustrating the organic photoelectric conversion element 118-1. Similarly, some components of the organic photoelectric conversion element 118-1 in FIG. 2 have been omitted for sake of brevity. Furthermore, additional features may be added to the organic photoelectric conversion element 118-1 in accordance with some embodiments of the disclosure.

As shown in FIG. 1 and FIG. 2, in some embodiments, the organic photoelectric conversion element 118-1 includes bottom conductive segments LE1, LE2, LE3, and LE4 disposed on the substrate 102. For example, the bottom conductive segments LE1, LE2, LE3, and LE4 may be transparent electrodes, which may include indium tin oxide (ITO), indium zinc oxide (IZO), silver (Ag) nanowire, graphene, carbon nanotube (CNT), the like, or a combination thereof, but the present disclosure is not limited thereto.

Moreover, the bottom conductive segments LE1-LE4 may be formed by a deposition process and a patterning process. The deposition process may include, for example, physical vapor deposition (PVD), chemical vapor deposition (CVD), atomic layer deposition (ALD), evaporation, sputtering, the like, or a combination thereof, but the present disclosures is not limited thereto. The patterning process may include, for example, forming a mask layer (not illustrated) on the deposited material layer, then etching the portion of the deposited material layer that is not covered by the mask layer, and forming the bottom conductive segments LE1-LE4.

In some embodiments, the mask layer includes a photoresist, such as a positive photoresist or a negative photoresist. In other embodiments, the mask layer includes metal, metal oxide, metal nitride, such as Ti, $TiO_2$, TiN, Al, $Al_2O_3$, AlN, Cr, and Nb, or dielectric materials, such as silicon oxide ($SiO_2$), silicon nitride (SiN), silicon oxynitride (SiON), silicon carbide (SiC), silicon carbonitride (SiCN), the like, or a combination thereof. The mask layer may be a single layer or a multilayer structure. The mask layer may be formed by a deposition process, a photolithography process, other suitable processes, or a combination thereof. For example, the deposition process includes spin-on coating, chemical vapor deposition, atomic layer deposition, the like, or a combination thereof. For example, the photolithography process may include photoresist coating (for example, spin coating), soft baking, mask aligning, exposure, post-exposure baking (PEB), developing, rinsing, drying (for example, hard baking), other suitable processes, or a combination thereof.

As shown in FIG. 1 and FIG. 2, in some embodiments, the organic photoelectric conversion element 118-1 includes a top conductive layer UE1 disposed on the bottom conductive segments LE1-LE4 and an organic layer PD1 disposed between the bottom conductive segments LE1-LE4 and the top conductive layer UE1. The top conductive layer UE1 may include the same or similar materials as the bottom conductive segments LE1-LE4, but the present disclosure is not limited thereto. The organic layer PD1 may include perovskites, organic bulk heterojunctions, quantum dots (QDs), or any other applicable organic material, but the present disclosure is not limited thereto. Moreover, top conductive layer UE1 may be formed by a deposition process. Examples of the deposition process are described above, which will not be repeated here.

As shown in FIG. 1 and FIG. 2, in some embodiments, the organic photoelectric conversion element 118-1 further includes a bottom carrier transporting layer BCT1 and a top carrier transporting layer TCT1. The bottom carrier transporting layer BCT1 is disposed between the bottom conductive segments LE1-LE4 and the organic layer PD1, and the top carrier transporting layer TCT1 is disposed between the organic layer PD1 and the top conductive layer UE1. For example, the bottom carrier transporting layer BCT1 and the top carrier transporting layer TCT1 may include inorganic materials, such as ZnO, NiO, $MoO_3$, $WO_3$, the like, or a combination thereof, or organic materials, such as poly(3, 4-ethylenedioxythiophene) (PEDOT), poly[bis(4-phenyl)(2, 4,6-triMethylphenyl)aMine] (PTAA), Spiro-OMeTAD, or the like, but the present disclosure is not limited thereto. Moreover, the bottom carrier transporting layer BCT1 and the top carrier transporting layer TCT1 may be formed by deposition processes. Examples of the deposition process are described above, which will not be repeated here.

As shown in FIG. 2, in some embodiments, the thickness T of the organic layer PD1 is greater than about 500 nm, such as 1500 nm. When exposed to light, carriers, such as electrons E or electron holes EH, may move in the organic layer PD1. In this embodiment, the thickness T of the organic layer PD1 is greater than about 500 nm (e.g., 1500 nm), which is greater than the electron diffusion length EDL or the electron hole diffusion length HDL, so that the organic layer PD1 may be divided into an effective region ER and two ineffective regions IER, and the effective region ER is between the ineffective regions IER.

This is because when thickness T of the organic layer PD1 (which may also be referred to as an active layer) is greater than the electron diffusion length EDL or the electron hole diffusion length HDL (which are often in the range from about 500 nm to about 1000 nm), carriers (e.g., electrons E or electron holes EH) generated outside the effective region ER cannot diffuse to the electrode (e.g., bottom conductive segments LE1-LE4 or top conductive layer UE1). In other words, carriers (e.g., electrons E or electron holes EH) generated in the effective region ER are able to transport to the electrode (e.g., bottom conductive segments LE1-LE4 or top conductive layer UE1), but carriers (e.g., electrons E or electron holes EH) generated outside the effective region ER (i.e., in the ineffective region IER) are not able to reach the electrode.

In the range of the effective region ER, carriers, such as electrons E or electron holes EH, generated by the light can diffuse to the electrodes, and signals (that are generated in the electrodes) may be read. In the range of the ineffective region IER, only light is absorbed, but no signal is generated, so that the organic layer PD1 may be a filter-like layer which may be formed to absorb a few portion of the short-wavelength light without conversion to a electrical signal.

As shown in FIG. 1, in some embodiments, the bio-chip 100A includes an insulating layer IL is disposed between the substrate 102 and the bottom carrier transporting layer BCT1. In more detail, insulating layer IL is disposed between the substrate 102 and the bottom conductive segments LE1-LE4, and between the bottom conductive segments LE1-LE4. For example, the insulating layer IL may include, for example, an oxide such as silicon oxide, a nitride such as silicon nitride, the like, or a combination thereof, but the present disclosure is not limited thereto. Moreover, the insulating layer IL may be deposited by metal organic chemical vapor deposition (MOCVD), atomic layer deposition, molecular beam epitaxy (MBE), liquid phase epitaxy (LPE), the like, or a combination thereof.

As shown in FIG. 1, in some embodiments, the bio-chip 100A includes a polarizing array disposed on the organic photoelectric conversion element 118-1. As shown in FIG. 1, in this embodiment, the polarizing array includes multiple polarizing sets 104, and each polarizing set 104 corresponds to one pixel unit P and has sub-polarizing units 104A, 104B that have different polarizing angles. The term "polarizing angle" used herein means that the light polarizing at an angle of 90° shift or perpendicular to the polarizing angle cannot pass through the sub-polarizing unit having this polarizing angle.

In some embodiments, the polarizing set 104 includes a sub-polarizing unit 104A and a sub-polarizing unit 104B. The sub-polarizing unit 104A may have a first polarizing angle, and the polarizing unit 104B may have a second sub-polarizing angle. The difference of the absolute values between the first polarizing angle and the second polarizing angle may be greater than 0° and less than 180°, such as 0°, 45°, 90°, 135°, or 180°. In some certain embodiments, the difference of the absolute values between the first polarizing angle and the second polarizing angle is 90°. Although the polarizing set 104 of the bio-chip 100A is illustrated as having two kinds of sub-polarizing units in FIG. 1, the present disclosure is not limited thereto. In some other embodiments, the polarizing set 104 includes any other sub-polarizing unit (not shown) with different polarizing angle from the sub-polarizing unit 104A and the sub-polarizing unit 104B.

The sub-polarizing unit (e.g., 104A or 104B) may include a layer of metal wire grating. For example, the sub-polarizing unit may include an opaque material, such as aluminum (Al), gold (Au), silver (Ag), titanium (Ti), niobium (Nb), or a combination thereof. The metal wire grating may have a film thickness of about 20 nm to about 300 nm. Moreover, the metal wire grating may have a period of about 20 nm to about 400 nm. The metal wire grating may have a filling ratio (or duty cycle) of about 0.2 to about 0.8. The orientation of grating ridge mainly affects the transmission percentage of a polarized light. For example, when the polarized light is parallel, 45° shifted, or 90° shifted, to the orientation of the sub-polarizing unit 104A or the sub-polarizing units 104B, the transmission light intensity after passing through the sub-polarizing units is the maximum, about 50%, or minimum, respectively.

In addition to the polarizing angle of the sub-polarizing units, the extinction ratio of the blocking efficiency may be also affected by the film thickness, grating period, grating profile, and filling ratio of the metal wire. It has been simulated in Peng Li et al. "Investigation of achromatic micro polarizer array for polarization imaging in visible-infrared band." Optik, vol. 158, April 2018, pp. 1427-1435 that the extinction ratio could reach $10^4$ (equivalent to an optical density (OD) of 4) using aluminum wire with a thickness of 160 nm, a filling ratio of 0.5, and a period of 150 nm. In some embodiments, a light illumination system with an optical density of greater than 3 for blocking the excitation light may be sufficient for bio sensing applications.

As shown in FIG. 1, the bio-chip 100A includes a light-shielding layer 110 disposed between the polarizing sets 104. For example, the light-shielding layer 110 may include metal, such as copper (Cu), silver (Ag), and so on, but the present disclosure is not limited thereto. Alternately, the light-shielding layer 110 may include photoresist (e.g., black photoresist, or other applicable photoresist which is not transparent), ink (e.g., black ink, or other applicable ink which is not transparent), molding compound (e.g., black molding compound, or other applicable molding compound which is not transparent), solder mask (e.g., black solder mask, or other applicable solder mask which is not transparent), (black-)epoxy polymer, any other applicable material, or a combination thereof. The light-shielding layer 110 may include a light curing material, a thermal curing material, or a combination thereof. Moreover, the light-shielding layer 110 may be formed by a deposition process and a patterning process. Examples of the deposition process and the patterning process are described above, which will not be repeated here.

As shown in FIG. 1, in some embodiments, the bio-chip 100A includes a filter element 116 disposed between the organic photoelectric conversion element 118-1 and the polarizing array for the laser light rejection (i.e., to reject the most of the excitation light). For example, the filter element 116 may be a rejection filter that may filter the excitation light from entering the organic photoelectric conversion element 118-1. The filter element 116 may include an absorption filter, an interference filter, a plasmonic metasurface structure, a dielectric metasurface structure, the like, or a combination thereof, but the present disclosure is not limited thereto.

As shown in FIG. 1, in some embodiments, the bio-chip 100A includes reaction sites 108 disposed on the polarizing array, and each reaction site 108 corresponds to one of the sub-polarizing units (e.g., sub-polarizing unit 104A or sub-polarizing unit 104B). The reaction sites 108 are used to capture the pre-determined bio-samples BS. In some embodiments, the reaction sites 108 are formed as nanowells or nanopatterns. As shown in FIG. 1, the reaction sites 108 may be defined by openings in the sample isolation layer 106. In other examples, the sample isolation layer 106 may not have openings. The reaction sites 108 may be formed by modifying a portion of the surface of the sample isolation layer 106 so that only the modified portion can capture the pre-determined bio-samples BS. For example, some of the functional groups on the surface of the sample isolation layer 106 may be modified to capture the desired bio-samples BS.

Moreover, the sample isolation layer 106 where the reaction sites 108 are disposed may be modified further to enhance bio-sample immobilization. For example, the sample isolation layer 106 may be coated or treated with self-assembly monolayers (SAMs), functional polymers, or hydrogels for bio-sample immobilization on the reaction sites 108. In another example, the sample isolation layer 106 may not be modified. Bio-samples BS may be immobilized on the reactions sites 108 depending on their weight, size, surface charge, or van der Waals force, and so on.

The sample isolation layer 106 may be formed using sputtering, evaporation, spin-coating, chemical vapor deposition, molecular beam deposition, any other suitable process, or a combination thereof. For example, the chemical vapor deposition process may include low-pressure chemical vapor deposition (LPCVD), low-temperature chemical vapor deposition (LTCVD), rapid thermal chemical vapor deposition (RTCVD), plasma enhanced chemical vapor deposition (PECVD), atomic layer deposition (ALD), or a combination thereof.

The sample isolation layer 106 may be transparent, semi-transparent, or opaque. More specifically, in the embodiments where the sample isolation layer 106 is transparent, the material of the sample isolation layer 106 may have a light transmittance to light with a wavelength in a range from 400 nm to 750 nm greater than about 85%, or greater than about 92%. In the embodiments where the sample isolation layer 106 is semi-transparent, the material of the sample isolation layer 106 may have a light transmittance to light with a wavelength in a range from 400 nm to 750 nm greater than about 25% and less than about 85%. In the embodiments where the sample isolation layer 106 is opaque, the material of the sample isolation layer 106 may have a light transmittance to light with a wavelength in a range from 400 nm to 750 nm less than about 10%, or less than about 5%.

The sample isolation layer 106 may include metal, metal alloy, metal oxides, metal nitrides, silicon, silicon oxides, silicon nitrides, or a combination thereof. For example, the metal, metal alloy, metal oxides, metal nitrides may include, but are not limited to, silver (Ag), aluminum (Al), gold (Au), niobium (Nb), titanium (Ti), tungsten (W), an alloy thereof, titanium oxide (e.g., $TiO_2$), tantalum oxide (e.g., $Ta_2O_5$), aluminum oxide (e.g., $Al_2O_3$), niobium oxide (e.g., $Nb_2O_5$), titanium nitride, tantalum nitride, or a combination thereof, but the present disclosure is not limited thereto.

As shown in FIG. 1, in some embodiments, the bio-chip 100A includes a planarization layer 120 disposed between the polarizing array (the polarizing sets 104) and the reaction sites 108. The planarization layer 120 may cover the surface of the polarizing array (the polarizing sets 104) facing the sample isolation layer 106, and provide a flat surface for the sample isolation layer 106. In addition, a portion of the planarization layer 120 may be exposed through the reaction sites 108 defined by openings of the sample isolation layer 106. For example, the planarization layer 120 may include silicon oxide ($SiO_2$), amorphous silicon (a-Si), aluminum oxide ($Al_2O_3$), niobium oxide ($Nb_2O_5$), polymer, or a combination thereof. The polymer may include, but is not limited to, bisbenzocyclobutene (BCB), polyimide (PI), polymethylmethacrylate (PMMA), cycloolefin polymer (COP), polycarbonate (PC), another suitable material, or a combination thereof.

The planarization layer 120 may be transparent or semi-transparent. More specifically, in the embodiments where the planarization layer 120 is transparent, the material of the planarization layer 120 may have a light transmittance to light with a wavelength in a range from 400 nm to 750 nm greater than about 85%, or greater than about 92%. In the embodiments where the planarization layer 120 is semi-transparent, the material of the planarization layer 120 may have a light transmittance to light with a wavelength in a range from 400 nm to 750 nm greater than about 25% and less than about 85%.

Referring to FIG. 1, the bio-detection system 10 includes an excitation light source configured to emit an excitation light EL, which may be used to excite multiple fluorophore-labelled bio-samples BS (e.g., labeled with Alexa 555). For example, the excitation light EL may have a wavelength of about 520 nm, but the present disclosure is not limited thereto. In some embodiments, the excitation light source emits excitation light EL with different wavelengths. For example, the excitation light source may include a plurality of sub-excitation light sources (not shown), and each sub-excitation light source may emit an excitation light with one excitation light wavelength. Alternatively, the sub-excitation light sources may emit multiple excitation lights with various excitation light wavelengths in turns. For example, the sub-excitation light sources with different excitation light wavelengths may emit excitation lights sequentially. Furthermore, the sub-excitation light sources may emit excitation lights in groups. Moreover, the excitation light source is a monochromator that continuously emits lights from a short wavelength to a long one (or from a long wavelength to a short one). For example, the monochromator may emit lights with wavelengths ranging from about 200 nm to about 1000 nm.

Referring to FIG. 1, the bio-detection system 10 includes a depletion light source facing the excitation light source and configured to emit a depletion light DL. For example, the depletion light source may emit stimulated emission depletion (STED) laser. In some embodiments, the wavelength of the depletion light DL is greater than 660 nm. For example, the wavelength of the depletion light DL is greater than the longest effective/responsive wavelength of the organic layer PD1, about 657 nm (refer to the FIG. 6, PD1(abs) and PD1@700 nm (abs)), such as about 685 nm or about 705 nm, but the present disclosure is not limited thereto.

The wavelength of depletion light DL should be tuned within the emission spectrum of the fluorophore and above the excitation wavelength such that it stimulates emission and depletes the excited state population of the fluorophore, thereby effectively "switching off" the florescence emission. Besides, in order not to be converted as signals by the organic layer PD1, the wavelength of depletion light DL should be greater than the longest effective/responsive wavelength of the organic layer PD1.

In general, the usage of the STED is to increase the lateral resolution beyond the diffraction limit. The depletion light is contrived to have an annular spatial profile that is zero on the optical axis with an outer diameter equal or a little larger than the excitation beam and an inner diameter of about 10 nm to 100 nm in the zero region. The detected fluorescence emission will therefore only exist on axis at the centre of the excitation light and in the zero region of the depletion laser but suppressed elsewhere according to the intensity of the depleting radiation. As the depletion light intensity is increased, the region of undepleted fluorophores decreases around the centre where the depletion intensity is zero.

In our proposed application (Referring to FIG. 1), there are multiple reaction sites 108 on a pixel unit P, and each reaction site 108 includes a kind of biosample BS and arranges on a polarizer unit (e.g., sub-polarizing unit 104A or 104B). For each signal capture, the excitation light EL illuminates on all the biosamples BS to emit fluorescence signal. Besides, the polarizing element 202 that is 90 degree shift to the polarizer unit (e.g., sub-polarizing unit 104A or 104B) will generate a zero-depletion-laser area on the bio-sample BS in the reaction site, and the other biosample BS on the other polarizer unit (e.g., sub-polarizing unit 104A or 104B) that is not 90 degree shift to the polarizing element 202 will be exposed to the depletion laser. Therefore, only one of the biosamples BS on a pixel unit (e.g., sub-polarizing unit 104A or 104B) with the polarizer angle 90 degree shift to the polarizing element 202 can be collected. After multiple imaging captures through rotation of the polarizing element 202, every signal of the biosamples on a pixel unit can be collected in a sequence.

Referring to FIG. 1, in some embodiments, the bio-chip 100A is disposed between the excitation light source and the depletion light source and configured to receive the excitation light EL and the depletion light DL. Moreover, in some embodiments, the bio-detection system 10 includes a polarizing element 202 disposed between the depletion light source and the bio-chip 100A, and the polarizing element 202 is configured to polarize the depletion light DL emitted from the depletion light source.

The bio-chip 100A may receive the depletion light DL that is polarized by the polarizing element 202. In some embodiments, the polarizing element 202 is a rotatable polarizing element. In other words, the polarizing element 202 may be orientable by rotation so that the polarizing element 202 may have the same polarizing angle as either the first polarizing angle of the sub-polarizing units 104A or the second polarizing angle of the sub-polarizing units 104B. Therefore, when the depletion light DL is a polarized light with 90° shift to the sub-polarizing units, the sub-polarizing units below the reaction sites will block the depletion light DL from passing through the sub-polarizing units.

For example, in the state shown in FIG. 1, the polarizing element 202 is oriented to have the first polarizing angle that allows the polarized depletion light DL to pass through the sub-polarizing units 104A, but does not allow it to pass through the sub-polarizing units 104B. In another state (not shown), the polarizing element 202 is oriented to have the second polarizing angle that allows the polarized depletion light DL to pass through the sub-polarizing units 104B, but does not allow it to pass through the sub-polarizing units 104A.

Referring to FIG. 1, the bio-detection system 10 includes a cover plate 204 disposed between the excitation light source and the bio-chip 100A as a fluidic cover for a sequential flow of bioreagents. For example, the cover plate 204 may be a transparent fluidic cover plate, such as glass, fused silica, quartz, PMMA, PDMS, or ceramic materials, to confine a fluidic volume on the bio-chip 100A for biochemistry reaction processes, including surface modification, washing, sample loading, background quenching for imaging, biomolecule cleavage, and so on.

Figure 3:
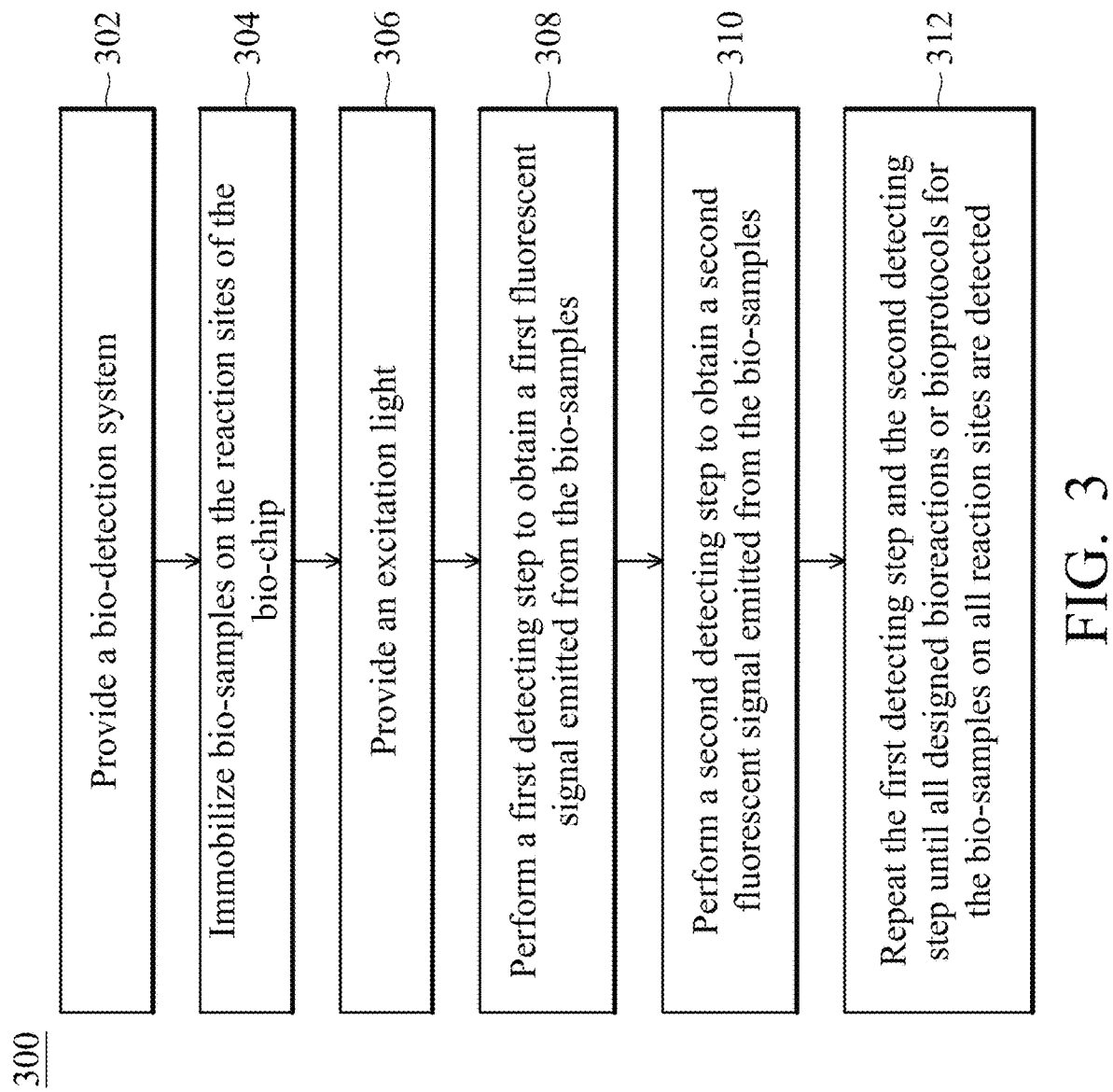
FIG. 3 is a flow diagram of a bio-detection method in accordance with some embodiments of the disclosure.

The present disclosure further provides a bio-detection method using the bio-detection system 10 described in the above embodiments. FIG. 3 is a flow diagram of a bio-detection method 300 in accordance with some embodiments of the disclosure. The bio-detection method 300 may include the following steps.

Referring to FIG. 3, in step 302, the bio-detection system 10 that includes the bio-chip 100A is provided.

Next, referring to FIG. 3, in step 304, the bio-samples BS are immobilized on the reaction sites 108. In particular, an appropriate amount of solution containing bio-samples BS is applied onto the bio-chips 100A. After the solution containing the bio-samples BS is settle down or immobilized on the reaction sites 108, excess residues of the bio-samples BS are removed from the region other than the reaction site 108, and the bio-samples BS may be immobilized on each of the reaction site 108.

The bio-samples BS may include, but is not limited to, biomolecules, chemical molecules, or a combination thereof. In some embodiments, the biomolecules may include, but is not limited to, DNA, RNA, proteins, or a combination thereof. Moreover, the bio-samples BS may be analyzed to determine a gene sequence, DNA-DNA hybridization, single nucleotide polymorphisms, protein interactions, peptide interactions, antigen-antibody interactions, glucose monitoring, cholesterol monitoring, and the like, but the present disclosure is not limited thereto.

Next, referring to FIG. 3, in step 306, an excitation light EL that is emitted from the excitation light source is provided.

Next, referring to FIG. 3, in step 308, the first detecting step is performed to obtain a first fluorescent signal emitted from the bio-samples BS immobilized on the reaction sites 108 that correspond to the sub-polarizing units 104B. In some embodiments, the first detecting step includes the following steps. The polarizing element 202 is adjusted to have a first polarizing angle that is 90 degrees different from the polarizing angle of one sub-polarizing unit (e.g., sub-polarizing unit 104B). Then, a depletion light DL that is emitted from the depletion light source is provided. Next, the first fluorescent signal emitted from the bio-samples BS is collected.

In particular, the polarizing element 202 is oriented to have a first polarizing angle that is 90 degrees different from the polarizing angle of the sub-polarizing unit 104B (e.g., the same polarizing angle as the sub-polarizing unit 104A) (i.e., the state shown in FIG. 1). The fluorescent signal generated from some bio-samples BS, which are disposed on the sub-polarizing units 104B, may be detected by the organic photoelectric conversion element 118-1 since the sub-polarizing units 104B block the polarized depletion light DL. Meanwhile, the fluorescent signal generated from other bio-samples BS, which are disposed on the sub-polarizing units 104A, may not be detected by the organic photoelectric conversion element 118-1 since the polarized depletion light DL that passes through the polarizing element 202 and the sub-polarizing units 104A depletes the fluorescent signal by enforcing the fluorophores emitting the same wavelength of the depletion light that is out of the organic photodiode responsive wavelength region, and thus no fluorescent signal in the photodiode detective region is generated from these bio-samples BS, thereby avoiding cross-talk.

Next, referring to FIG. 3, in step 310, the second detecting step is performed to obtain a second fluorescent signal emitted from the bio-samples BS immobilized on the reaction sites 108 that correspond to the sub-polarizing units 104A. In some embodiments, the second detecting step includes the following steps. The polarizing element 202 is adjusted to have a second polarizing angle that is 90 degrees different from the polarizing angle of one sub-polarizing unit (e.g., sub-polarizing unit 104A). Then, a depletion light DL that is emitted from the depletion light source is provided. Next, the second fluorescent signal emitted from the bio-samples BS is collected.

In particular, the polarizing element 202 is oriented to have a second polarizing angle that is 90 degrees different from the polarizing angle of the sub-polarizing unit 104A (e.g., the same polarizing angle as the sub-polarizing unit 104B). The fluorescent signal generated from some bio-samples BS, which are disposed on the sub-polarizing units 104A, may be detected by the organic photoelectric conversion element 118-1 since the sub-polarizing units 104A block the polarized depletion light DL. Meanwhile, the fluorescent signal generated from other bio-samples BS, which are disposed on the sub-polarizing units 104B, may not be detected by the organic photoelectric conversion element 118-1 since the polarized depletion light DL that passes through the polarizing element 202 and the sub-polarizing units 104B depletes the fluorescent signal by enforcing the fluorophores emitting the same wavelength of the depletion light that is out of the organic photodiode responsive wavelength region, and thus no fluorescent signal in the photodiode detective region is generated from these bio-samples BS, thereby avoiding cross-talk.

Next, referring to FIG. 3, in step 312, the first detecting step and the second detecting step are repeated until all designed bioreactions or bioprotocols for the bio-samples BS on all reaction sites 108 have been detected. In more detail, each bio-sample BS may need to go through multiple processes of bioreactions or bioprotocols. After each process, one detecting step (e.g. fluorescence observation) is required to obtain the fluorescence signal after the process is completed. Therefore, it is necessary to repeat the first detecting step (i.e., step 308) and the second detecting step (i.e., step 310) many times until all bioreactions or bioprotocols are completed, so that the biosensing signals of each bio-sample BS may be completely collected.

For example, when DNA sequencing is performed, after each bioreaction or bioprotocol process, it may only obtain whether the detected bio-sample BS is connected with an A, T, G, C, or no base, and the next bioreaction or bioprotocol process is used to detect whether the next sequence is A, T, G, C, or none. Such bioreaction or bioprotocol process may be repeated hundreds of times to decipher the DNA sequence on the detected bio-sample BS.

Figure 4B:
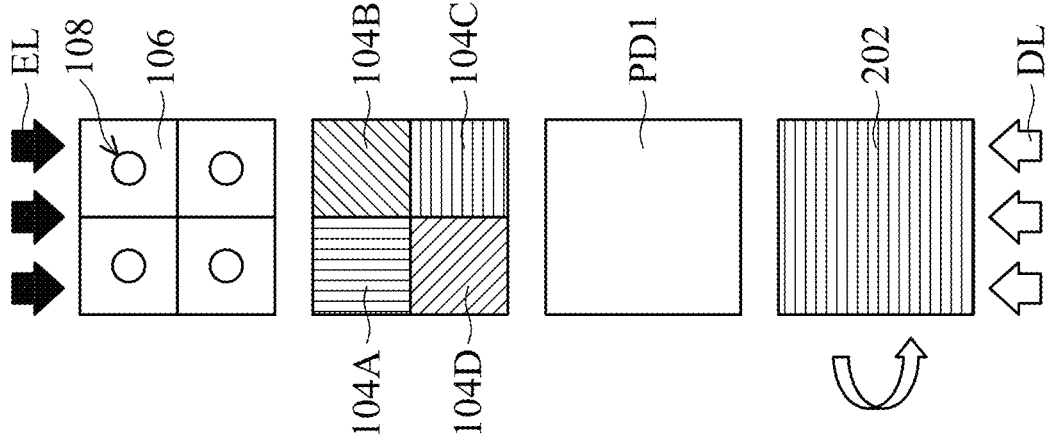
FIG. 4B is a schematic diagram illustrating a bio-detection system according to some other embodiments of the present disclosure.
Figure 4A:
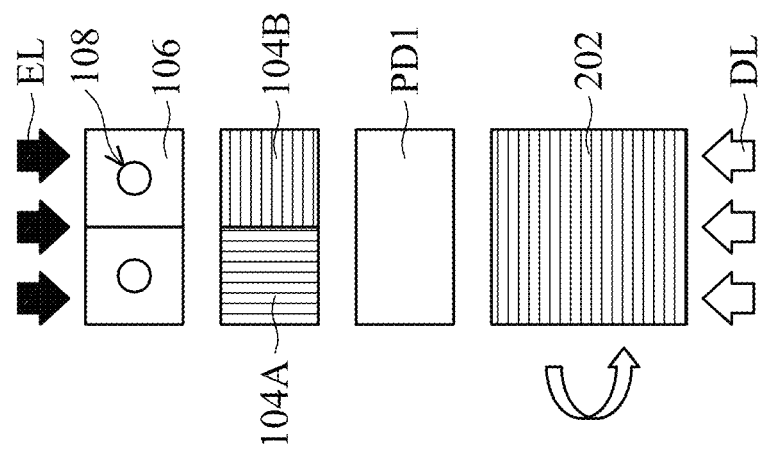
FIG. 4A is a schematic diagram illustrating a bio-detection system according to some embodiments of the present disclosure.

FIG. 4A is a schematic diagram illustrating a bio-detection system 10 according to some embodiments of the present disclosure, FIG. 4B is a schematic diagram illustrating a bio-detection system 10 according to some other embodiments of the present disclosure, in which the sample isolation layer 106, the polarizing set 104 (that includes sub-polarizing units 104A and 104B), the organic layer PD1, and the polarizing element 202 are presented in top views.

In the embodiment shown in FIG. 4A, the number of sub-polarizing units in one polarizing set 104 is 2 (i.e., sub-polarizing units 104A and 104B), each sub-polarizing unit has a rectangular shape, and the sub-polarizing units form a 2×1 (or 1×2) array. That is, FIG. 4A shows that two reaction sites 108 (nanowells or nanopatterns) correspond to one pixel unit P. In this embodiment, the polarizing angle of the sub-polarizing unit is $\theta_m$, where m is a positive integer equal to or less than 2. For example, the polarizing angle of the sub-polarizing unit 104A may be referred to as $\theta_1$ (e.g., 0°), and the polarizing angle of the sub-polarizing unit 104B may be referred to as $\theta_2$ (e.g., 90°).

Moreover, the polarizing element 202 may be adjusted (rotated) to have a polarizing angle of ($\theta_m$+90°) (m=1 or 2). For example, when the polarizing element 202 is adjusted (rotated) to have a polarizing angle of $\theta_1$+90°, the ratio of the depletion light DL passing through the sub-polarization unit 104A is 0, and the ratio of the depletion light DL passing through the sub-polarization unit 104B is 1, but the present disclosure is not limited thereto.

In the embodiment shown in FIG. 4B, the number of sub-polarizing units in one polarizing set 104 is 4 (i.e., sub-polarizing units 104A, 104B, 104C, and 104D), each sub-polarizing unit has a rectangular shape, and the sub-polarizing units form a 2×2 array. That is, FIG. 4B shows that four reaction sites 108 (nanowells or nanopatterns) correspond to one pixel unit P. In this embodiment, the polarizing angle of the sub-polarizing unit is $\theta_m$, where m is a positive integer equal to or less than 4. For example, the polarizing angle of the sub-polarizing unit 104A may be referred to as $\theta_1$ (e.g., 0°), the polarizing angle of the sub-polarizing unit 104B may be referred to as $\theta_2$ (e.g., 45°), the polarizing angle of the sub-polarizing unit 104C may be referred to as $\theta_3$ (e.g., 90°), and the polarizing angle of the sub-polarizing unit 104D may be referred to as $\theta_4$ (e.g., 135°).

In this embodiment, the sub-polarizing units 104A, 104B, 104C, and 104D in one polarizing set 104 are arranged in a clockwise direction, but the present disclosure is not limited thereto. In some other embodiments, the sub-polarizing units in one polarizing set 104 are arranged in a counterclockwise direction or an S-shaped direction, or arranged in random.

Moreover, the polarizing element 202 may be adjusted (rotated) to have a polarizing angle of ($\theta_m$+90°) (m=1~4). For example, when the polarizing element 202 is adjusted (rotated) to have a polarizing angle of $\theta_1$+90°, the ratio of the depletion light DL passing through the sub-polarization unit 104A is 0, the ratio of the depletion light DL passing through the sub-polarization unit 104B is 0.5, the ratio of the depletion light DL passing through the sub-polarization unit 104C is 1, and the ratio of the depletion light DL passing through the sub-polarization unit 104D is 0.5, but the present disclosure is not limited thereto.

Figures 5A, 5B:
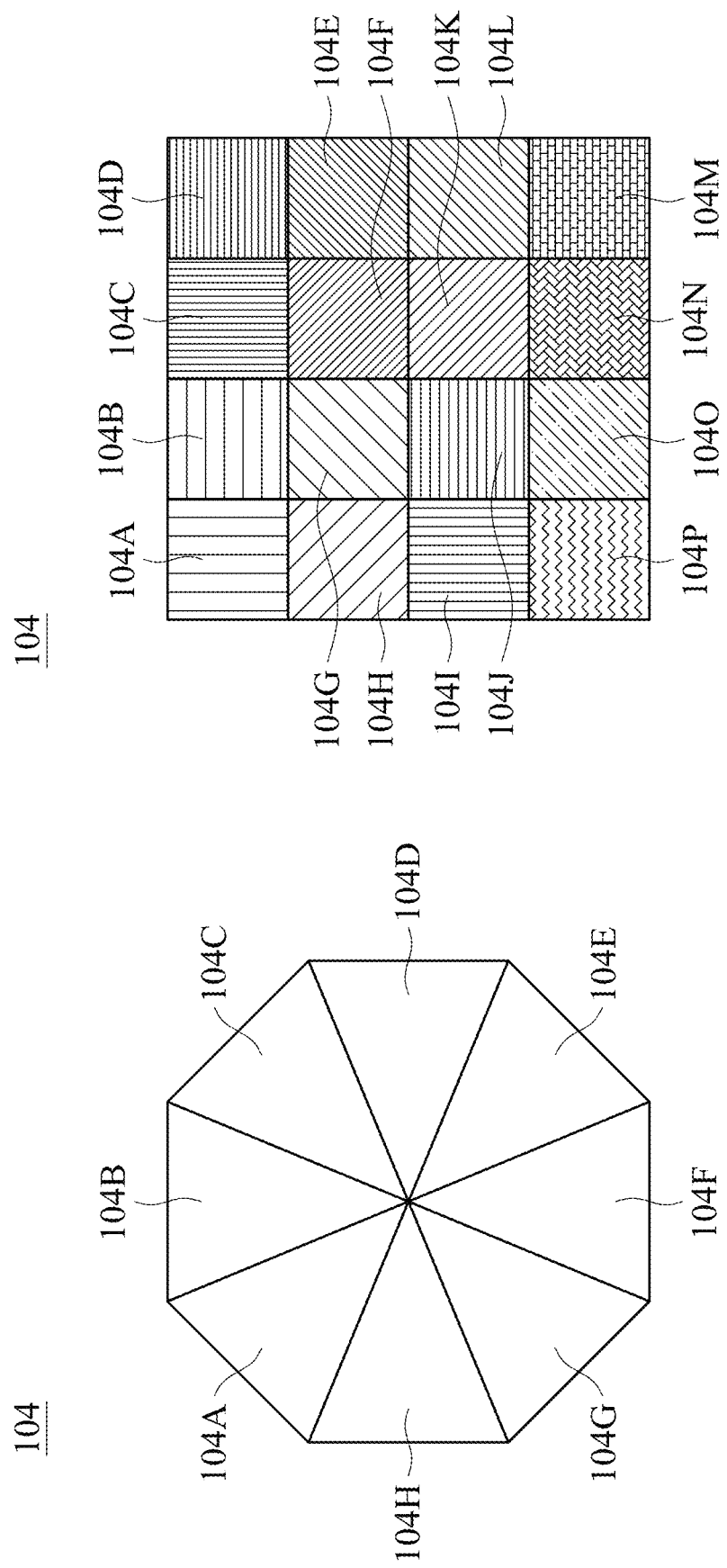
FIG. 5A is a top view illustrating a polarizing set according to some embodiments of the present disclosure.
FIG. 5B is a top view illustrating a polarizing set according to some other embodiments of the present disclosure.

FIG. 5A is a top view illustrating a polarizing set 104 according to some embodiments of the present disclosure. FIG. 5B is a top view illustrating a polarizing set 104 according to some other embodiments of the present disclosure.

Referring to FIG. 5A, in this embodiment, the number of sub-polarizing units in one polarizing set 104 is 8 (i.e., sub-polarizing units 104A, 104B, 104C, 104D, 104E, 104F, 104G, and 104H), and each sub-polarizing unit has a triangular shape. Moreover, the sub-polarizing units 104A, 104B, 104C, 104D, 104E, 104F, 104G, and 104H in one polarizing set 104 are arranged in a clockwise direction. That is, FIG. 5A may represent that eight reaction sites 108 (nanowells or nanopatterns) correspond to one pixel unit P.

In this embodiment, the polarizing angle of the sub-polarizing unit is $\theta_m$, where m is a positive integer equal to or less than 8. For example, the polarizing angle of the sub-polarizing unit 104A may be referred to as $\theta_1$ (e.g., 0°), the polarizing angle of the sub-polarizing unit 104B may be referred to as $\theta_2$ (e.g., 22.5°), the polarizing angle of the sub-polarizing unit 104C may be referred to as $\theta_3$ (e.g., 45°), the polarizing angle of the sub-polarizing unit 104D may be referred to as $\theta_4$ (e.g., 67.5°) the polarizing angle of the sub-polarizing unit 104E may be referred to as $\theta_5$ (e.g., 90°), the polarizing angle of the sub-polarizing unit 104F may be referred to as $\theta_6$ (e.g., 112.5°), the polarizing angle of the sub-polarizing unit 104G may be referred to as $\theta_7$ (e.g., 135°), and the polarizing angle of the sub-polarizing unit 104H may be referred to as $\theta_8$ (e.g., 157.5°).

Moreover, the polarizing element 202 may be adjusted (rotated) to have a polarizing angle of $(\theta_m+90°)$ (m=1~8). For example, when the polarizing element 202 is adjusted (rotated) to have a polarizing angle of $\theta_1+90°$, the ratio of the depletion light DL passing through the sub-polarization unit 104A is 0, the ratio of the depletion light DL passing through the sub-polarization unit 104B and the sub-polarization unit 104H is 0.15, the ratio of the depletion light DL passing through the sub-polarization unit 104C and sub-polarization unit 104G is 0.5, the ratio of the depletion light DL passing through the sub-polarization unit 104D and sub-polarization unit 104F is 0.85, and the ratio of the depletion light DL passing through the sub-polarization unit 104E is 1, but the present disclosure is not limited thereto.

Referring to FIG. 5B, in this embodiment, the number of sub-polarizing units in one polarizing set 104 is 16 (i.e., sub-polarizing units 104A, 104B, 104C, 104D, 104E, 104F, 104G, 104H, 104I, 104J, 104K, 104L, 104M, 104N, 104O, and 104P), each sub-polarizing unit has a rectangular shape, and the sub-polarizing units form a 4×4 array. Moreover, the sub-polarizing units 104A, 104B, 104C, 104D, 104E, 104F, 104G, 104H, 104I, 104J, 104K, 104L, 104M, 104N, 104O, and 104P in one polarizing set 104 are arranged in an S-shaped direction. That is, FIG. 5B may represent that sixteen reaction sites 108 (nanowells or nanopatterns) correspond to one pixel unit P.

In this embodiment, the polarizing angle of the sub-polarizing unit is Om, where m is a positive integer equal to or less than 16. For example, the polarizing angle of the sub-polarizing unit 104A may be referred to as $\theta_1$ (e.g., 0°), the polarizing angle of the sub-polarizing unit 104B may be referred to as $\theta_2$ (e.g., 11.25°), the polarizing angle of the sub-polarizing unit 104C may be referred to as $\theta_3$ (e.g., 22.5°), the polarizing angle of the sub-polarizing unit 104D may be referred to as $\theta_4$ (e.g., 33.75°) the polarizing angle of the sub-polarizing unit 104E may be referred to as $\theta_5$ (e.g., 45°), the polarizing angle of the sub-polarizing unit 104F may be referred to as $\theta_6$ (e.g., 56.25°), the polarizing angle of the sub-polarizing unit 104G may be referred to as $\theta_7$ (e.g., 67.5°), the polarizing angle of the sub-polarizing unit 104H may be referred to as $\theta_8$ (e.g., 78.75°), the polarizing angle of the sub-polarizing unit 104I may be referred to as $\theta_9$ (e.g., 90°), the polarizing angle of the sub-polarizing unit 104J may be referred to as $\theta_{10}$ (e.g., 101.25°), the polarizing angle of the sub-polarizing unit 104K may be referred to as $\theta_{11}$ (e.g., 112.5°), the polarizing angle of the sub-polarizing unit 104L may be referred to as $\theta_{12}$ (e.g., 123.75°) the polarizing angle of the sub-polarizing unit 104M may be referred to as $\theta_{13}$ (e.g., 135°), the polarizing angle of the sub-polarizing unit 104N may be referred to as $\theta_{14}$ (e.g., 146.25°), the polarizing angle of the sub-polarizing unit 104O may be referred to as $\theta_{15}$ (e.g., 157.5°), and the polarizing angle of the sub-polarizing unit 104P may be referred to as $\theta_{16}$ (e.g., 168.75°).

Moreover, the polarizing element 202 may be adjusted (rotated) to have a polarizing angle of $(\theta_m+90°)$ (m=1~16). For example, when the polarizing element 202 is adjusted (rotated) to have a polarizing angle of $\theta_1+90°$, the ratio of the depletion light DL passing through the sub-polarization unit 104A is 0, the ratio of the depletion light DL passing through the sub-polarization unit 104B and the sub-polarization unit 104P is 0.04, the ratio of the depletion light DL passing through the sub-polarization unit 104C and sub-polarization unit 104O is 0.15, the ratio of the depletion light DL passing through the sub-polarization unit 104D and sub-polarization unit 104N is 0.31, the ratio of the depletion light DL passing through the sub-polarization unit 104E and sub-polarization unit 104M is 0.5, the ratio of the depletion light DL passing through the sub-polarization unit 104F and sub-polarization unit 104L is 0.69, the ratio of the depletion light DL passing through the sub-polarization unit 104G and sub-polarization unit 104K is 0.85, the ratio of the depletion light DL passing through the sub-polarization unit 104H and sub-polarization unit 104J is 0.96, and the ratio of the depletion light DL passing through the sub-polarization unit 104I is 1, but the present disclosure is not limited thereto.

In some embodiments, the number of sub-polarizing units in one polarizing set 104 is n, and n is a positive integer between 2 and 25. Moreover, in some embodiments, the sub-polarizing unit has a polarizing angle that is 180°/n shift to that of a previous sub-polarizing unit, wherein n is the number of sub-polarizing units in one polarizing set.

Figure 6:
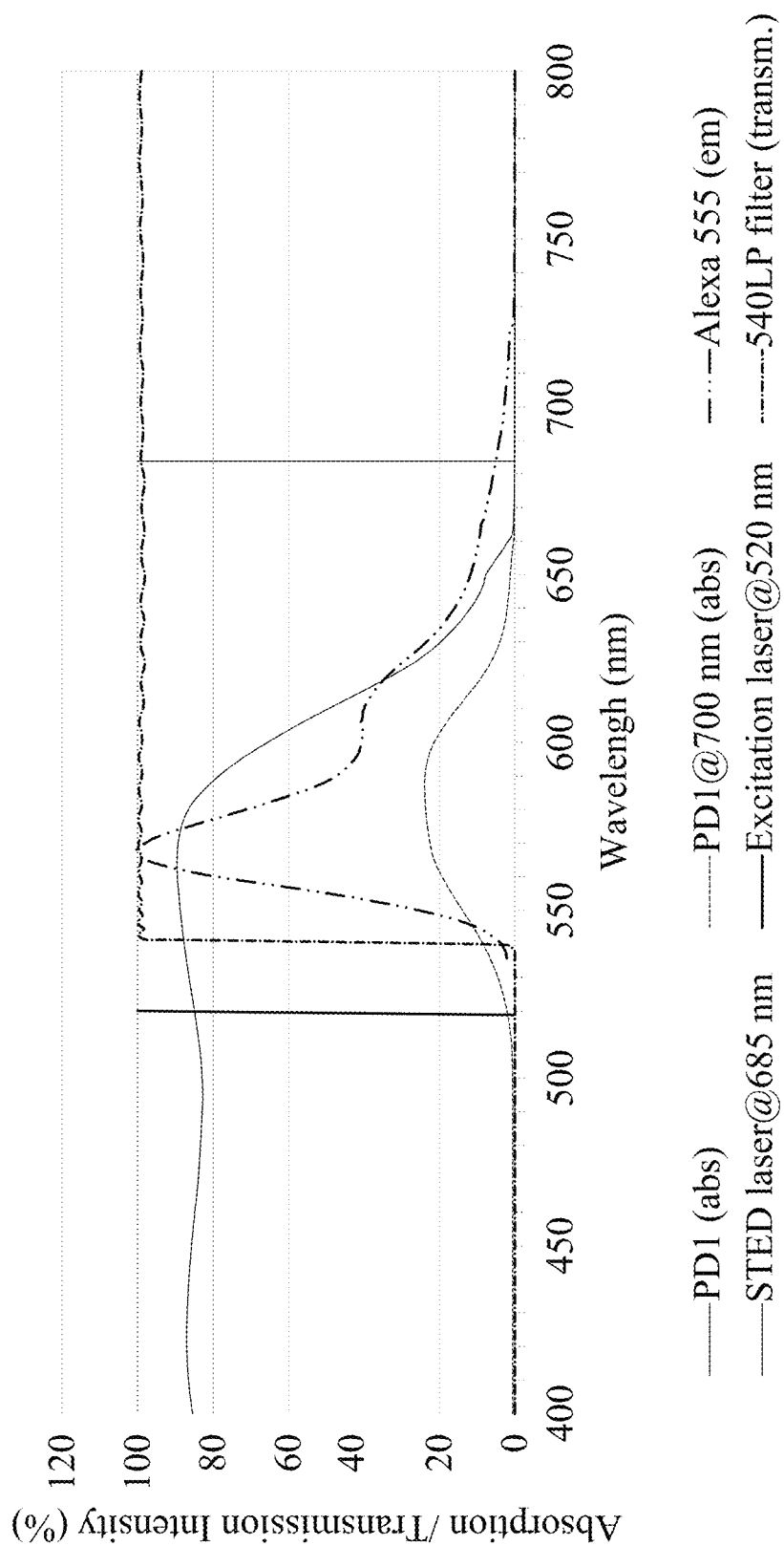
FIG. 6 illustrates an excitation light laser wavelength, a depletion light laser wavelength, and an emission spectrum of Alexa 555, effective response wavelengths of the organic layer, and a long wavelength pass filter spectrum using the bio-detection system that includes the bio-chip.

FIG. 6 illustrates an excitation light laser wavelength (Excitation laser@520 nm), a depletion light laser wavelength (STED laser@685 nm), and an emission spectrum of Alexa 555 (Alexa 555(em)), effective response wavelengths of the organic layer (PD1(abs) and PD1@700 nm (abs)), and a long wavelength pass filter spectrum (540LP filter (transm.) using the bio-detection system 10 that includes the bio-chip 100A. The application of DNA sequencing is taken as an example. dNTP (N=A, T, G, or C) is labeled with a fluorescent marker, and the fluorescent marker can only be excited by the excitation light EL (not be excited by the depletion light DL). Alexa 555 can be excited by a light with a wavelength of 500~570 nm (excitation spectrum not shown), such as 520 nm, and emitted a fluorescence light with a wavelength of 540~720 nm (spectrum shown in FIG. 6, Alexa 555(em)).

Besides, the most portion of the emission wavelength of Alexa 555 is in effective response region of the organic layer in a thickness of 700 nm (spectrum in FIG. 6, PD1@700 nm (abs)), so the organic layer PD1 can detect the emission signals of Alexa 555. Therefore, if one sub-polarization unit receives the emission light of Alexa 555, it can be learned that the biosample in the reaction site 108 above the sub-polarization unit is bound by one Alexa 555-labeled dNTP for the indication of the occurrence of the dNTP in a pre-designed bioreaction process.

Figure 7:
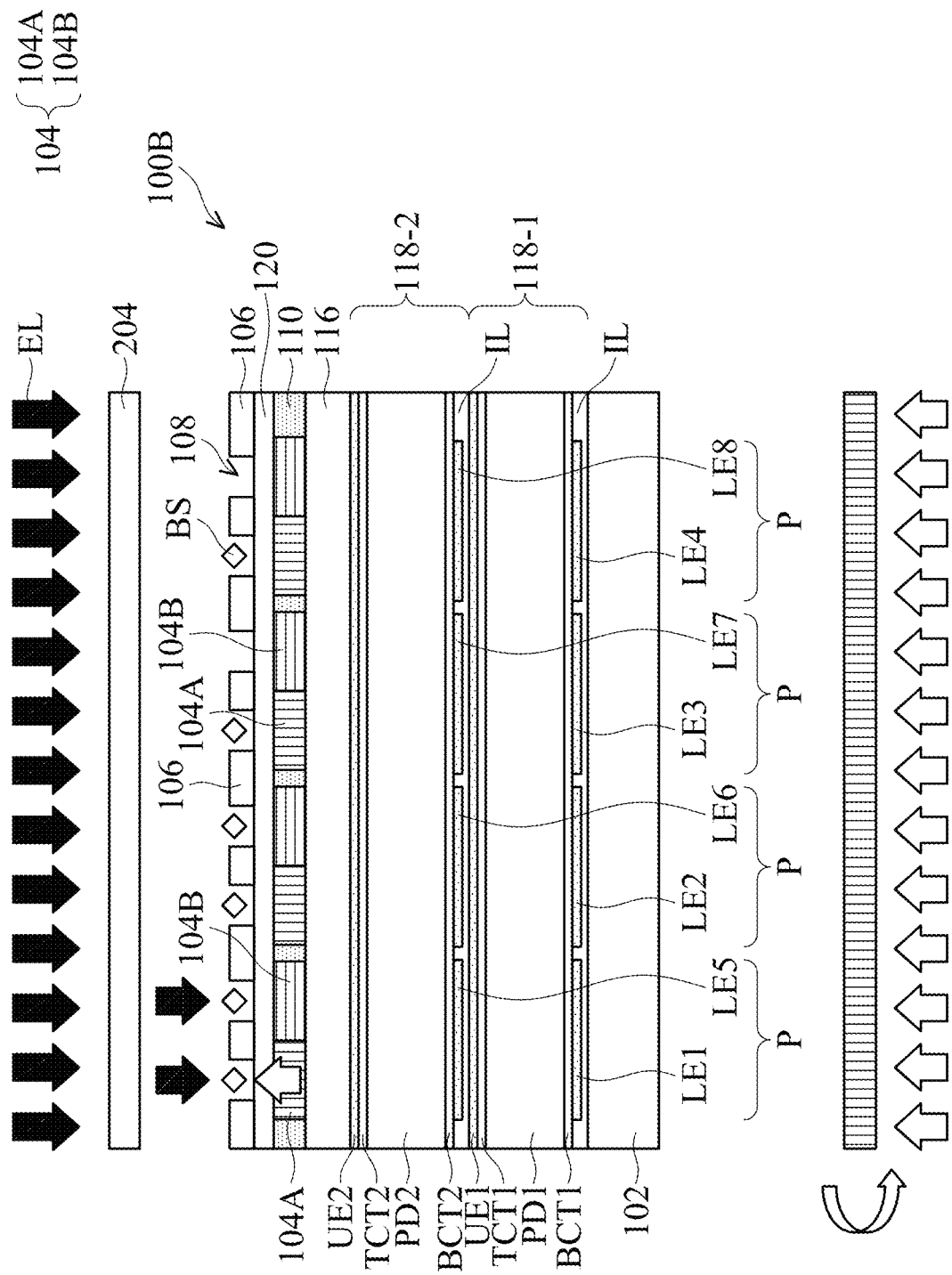
FIG. 7 is a cross-sectional view illustrating the bio-detection system according to some other embodiments of the present disclosure.

FIG. 7 is a cross-sectional view illustrating the bio-detection system 10 according to some other embodiments of the present disclosure. Similarly, some components of the bio-detection system 10 in FIG. 7 have been omitted for sake of brevity. Furthermore, additional features may be added to the bio-detection system 10 in accordance with some embodiments of the disclosure.

Referring to FIG. 7, in some embodiments, the bio-detection system 10 includes a bio-chip 100B. The main difference from the bio-chip 100A is that the bio-chip 100B further includes an organic photoelectric conversion element 118-2 disposed between the organic photoelectric conversion element 118-1 and the polarizing array (or the filter element 116).

The organic photoelectric conversion element 118-2 has a structure similar to that of the organic photoelectric conversion element 118-1, and the organic photoelectric conversion element 118-1 and the organic photoelectric conversion element 118-2 both define pixel units P. As shown in FIG. 7, in some embodiments, the organic photoelectric conversion element 118-2 includes bottom conductive segments LE5, LE6, LE7, and LE8 disposed on the organic photoelectric conversion element 118-1. The bottom conductive segments LE5-LE8 may include the same or similar materials as the bottom conductive segments LE1-LE4, but the present disclosure is not limited thereto.

As shown in FIG. 7, in some embodiments, the organic photoelectric conversion element 118-2 includes a top conductive layer UE2 disposed on the bottom conductive segments LE5-LE8 and an organic layer PD2 disposed between the bottom conductive segments LE5-LE8 and the top conductive layer UE2. The top conductive layer UE2 may include the same or similar materials as the bottom conductive segments LE5-LE8, but the present disclosure is not limited thereto.

In some embodiments, the effective responsive wavelength of the organic layer PD2 is different from the effective responsive wavelength of the organic layer PD1. For example, the effective responsive wavelength of the organic layer PD2 is more than about nm longer than the effective responsive wavelength of the organic layer PD1, but the present disclosure is not limited thereto.

As shown in FIG. 7, in some embodiments, the organic photoelectric conversion element 118-2 further includes a bottom carrier transporting layer BCT2 and a top carrier transporting layer TCT2. The bottom carrier transporting layer BCT2 is disposed between the bottom conductive segments LE5-LE8 and the organic layer PD2, and the top carrier transporting layer TCT2 is disposed between the organic layer PD2 and the top conductive layer UE2.

Figure 8:
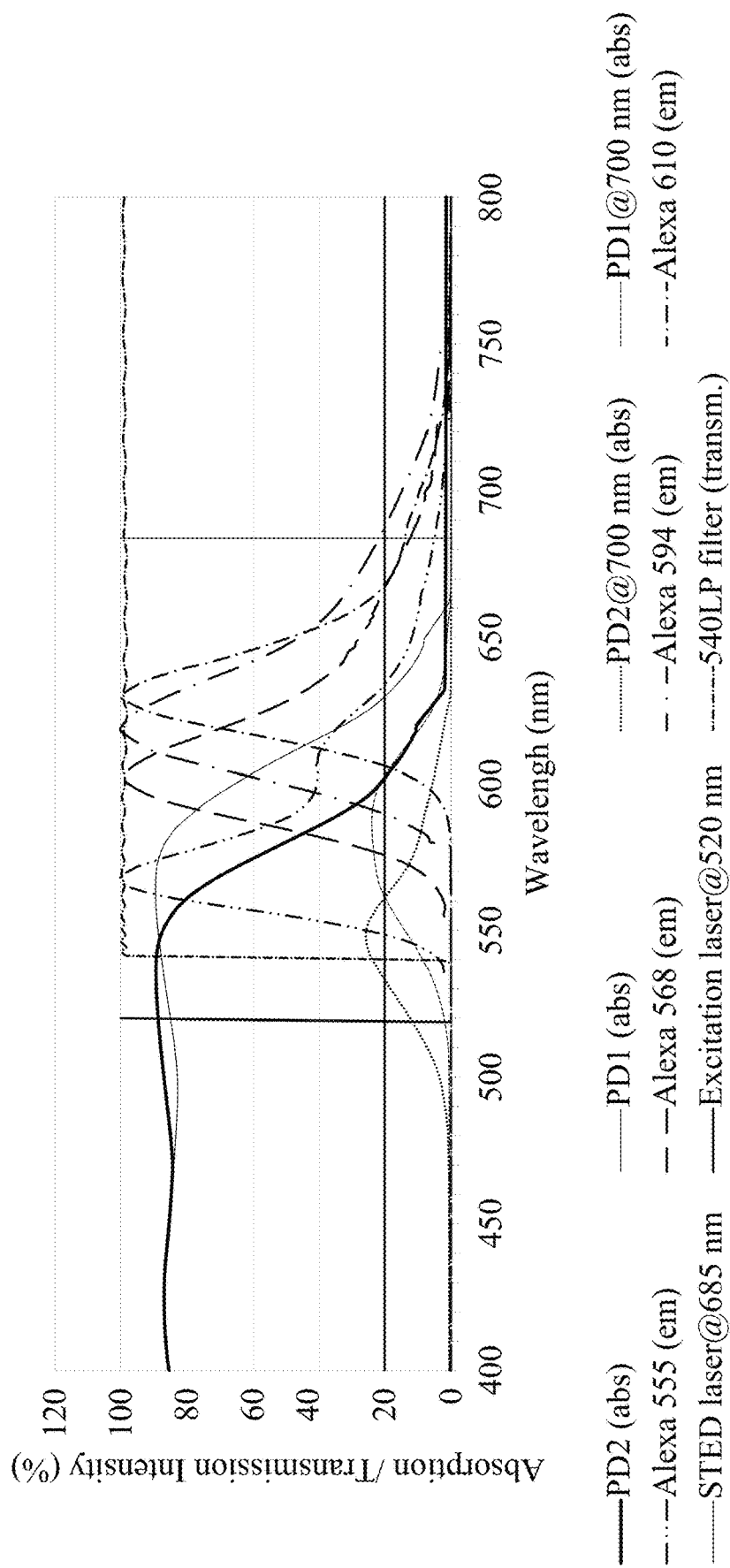
FIG. 8 illustrates an excitation light laser wavelength, a depletion light laser wavelength, and emission spectra of Alexa 555, Alexa 568, Alexa 594, and Alexa 610, effective response wavelengths of the organic layers, and a long wavelength pass filter spectrum using the bio-detection system that includes the bio-chip.

FIG. 8 illustrates an excitation light laser wavelength (Excitation laser@520 nm), a depletion light laser wavelength (STED laser@685 nm), and emission spectra of Alexa 555, Alexa 568, Alexa 594, and Alexa 610 (Alexa 555(em), Alexa 568(em), Alexa 594(em), and Alexa 610 (em)), effective response wavelengths of the organic layers (PD1(abs) and PD1@700 nm (abs)/PD2(abs) and PD2@700 nm (abs)), and a long wavelength pass filter spectrum (540LP filter (transm.) using the bio-detection system 10 that includes the bio-chip 100B. The application of DNA sequencing is taken as an example. dATP is labeled with a fluorescent marker Alexa 555, dTTP is labeled with a fluorescent marker Alexa 568, dGTP is labeled with a fluorescent marker Alexa 594, dCTP is labeled with a fluorescent marker Alexa 610, and those fluorescent markers can only be excited by the excitation light EL (not be excited by the depletion light DL). Alexa 555 can be excited by a light with a wavelength of 500570 nm (excitation spectrum not shown), such as 520 nm, and emitted a fluorescence light with a wavelength of 540~720 nm (spectrum shown in FIG. 8, Alexa 555(em)). Alexa 568 can be excited by a light with a wavelength of 500~580 nm (excitation spectrum not shown), such as 520 nm, and emitted a fluorescence light with a wavelength of 560~740 nm (spectrum shown in FIG. 8, Alexa 568(em)). Alexa 594 can be excited by a light with a wavelength of 500~620 nm (excitation spectrum not shown), such as 520 nm, and emitted a fluorescence light with a wavelength of 580~740 nm (spectrum shown in FIG. 8, Alexa 594(em)). Alexa 610 can be excited by a light with a wavelength of 500~650 nm (excitation spectrum not shown), such as 520 nm, and emitted a fluorescence light with a wavelength of 590~750 nm (spectrum shown in FIG. 8, Alexa 610(em)).

Besides, some portions of the emission wavelengths of Alexa 555, Alexa 568, Alexa 594, and Alexa 610 are in effective response region of the organic layer 1, PD1, and the organic layer 2, PD2, in a thickness of 700 nm (spectrum in FIG. 8, PD1@700 nm (abs) and PD2@700 nm (abs)) with different responsive sensitivity. Thus, using the intensity ratio between the organic layer 1, PD1, and the organic layer 2, PD2, the Alexa 555, Alexa 568, Alexa 594, and Alexa 610 can be distinguished for the indication of the occurrence of dATP, dTTP, dGTP, and dCTP. If one sub-polarization unit receives the emission light of Alexa 555, it can be learned that the biosample in the reaction site 108 above the sub-polarization unit is bound by one dATP-Alexa 555 in a pre-designed bioreaction process.

In summary, the bio-chip according to some embodiments of the present disclosure includes organic photoelectric conversion element with a relative thicker layer (500~1500 nm), which may have ineffective regions, IER, located at the upper or lower regions to only absorb short wavelength light, so that the inactive regions of the organic photoelectric conversion element may be used as a filter to reject partial the excitation light. Furthermore, the bio-detection system includes a depletion light source configured to emit a depletion light to exclude unwanted fluorescence interference in the reaction sites in a pixel unit and a polarizing element configured to polarize the depletion light, which may help to selectively collect a signal from a specific reaction site (e.g., nanowell) in a group of reaction sites.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Therefore, the scope of protection should be determined through the claims. In addition, although some embodiments of the present disclosure are disclosed above, they are not intended to limit the scope of the present disclosure.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

What is claimed is:

1. A bio-chip, comprising:
   a substrate;
   a first organic photoelectric conversion element disposed on the substrate, wherein the first organic photoelectric conversion element defines pixel units;
   a polarizing array disposed on the first organic photoelectric conversion element, wherein the polarizing array comprises polarizing sets, each of the polarizing sets corresponds to one of the pixel units, and each of the polarizing sets has sub-polarizing units that have different polarizing angles;

reaction sites disposed on the polarizing array, wherein each of the reaction sites corresponds to one of the sub-polarizing units.

2. The bio-chip as claimed in claim 1, wherein the first organic photoelectric conversion element comprises:
first bottom conductive segments disposed on the substrate, wherein the pixel units are defined by the first bottom conductive segments;
a first top conductive layer disposed on the first bottom conductive segments; and
a first organic layer disposed between the first bottom conductive segments and the first top conductive layer, wherein a thickness of the first organic layer is greater than 500 nm.

3. The bio-chip as claimed in claim 2, wherein the first organic photoelectric conversion element further comprises:
a first bottom carrier transporting layer disposed between the first bottom conductive segments and the first organic layer; and
a first top carrier transporting layer disposed between the first organic layer and the first top conductive layer.

4. The bio-chip as claimed in claim 3, further comprising:
a second organic photoelectric conversion element disposed between the first organic photoelectric conversion element and the polarizing array.

5. The bio-chip as claimed in claim 4, wherein the second organic photoelectric conversion element comprises:
second bottom conductive segments disposed on the first top conductive layer;
a second top conductive layer disposed on the second bottom conductive segments; and
a second organic layer disposed between the second bottom conductive segments and the second top conductive layer, wherein a thickness of the second organic layer is greater than 500 nm.

6. The bio-chip as claimed in claim 5, wherein an effective responsive wavelength of the second organic layer is different from an effective responsive wavelength of the first organic layer.

7. The bio-chip as claimed in claim 5, wherein the second organic photoelectric conversion element further comprises:
a second bottom carrier transporting layer disposed between the second bottom conductive segments and the second organic layer; and
a second top carrier transporting layer disposed between the second organic layer and the second top conductive layer.

8. The bio-chip as claimed in claim 1, wherein the reaction sites are formed as nanowells or nanopatterns.

9. The bio-chip as claimed in claim 1, wherein the number of sub-polarizing units in one of the polarizing sets is n, and n is a positive integer between 2 and 25.

10. The bio-chip as claimed in claim 1, wherein the sub-polarizing units in one of the polarizing sets are arranged in a clockwise direction, a counterclockwise direction, or an S-shaped direction.

11. The bio-chip as claimed in claim 10, wherein one of the sub-polarizing units has a polarizing angle that is 180°/n shift to that of a previous one of the sub-polarizing units, and n is the number of sub-polarizing units in one of the polarizing sets.

12. The bio-chip as claimed in claim 1, further comprising:
a filter element disposed between the first organic photoelectric conversion element and the polarizing array for laser light rejection.

13. The bio-chip as claimed in claim 1, further comprising:
a planarization layer disposed between the polarizing array and the reaction sites.

14. A bio-detection system, comprising:
an excitation light source configured to emit an excitation light;
a depletion light source facing the excitation light source and configured to emit a depletion light;
the bio-chip as claimed in claim 1 disposed between the excitation light source and the depletion light source and configured to receive the excitation light and the depletion light; and
a polarizing element disposed between the depletion light source and the bio-chip and configured to polarize the depletion light.

15. The bio-detection system as claimed in claim 14, wherein the polarizing element is a rotatable polarizing element.

16. The bio-detection system as claimed in claim 14, further comprising:
a cover plate disposed between the excitation light source and the bio-chip as a fluidic cover for a sequential flow of bioreagents.

17. The bio-detection system as claimed in claim 14, wherein a wavelength of the depletion light is greater than or equal to 660 nm.

18. The bio-detection system as claimed in claim 14, wherein the excitation light source emits excitation light with different wavelengths.

19. A bio-detection method, comprising:
providing the bio-detection system as claimed in claim 14;
immobilizing bio-samples on the reaction sites of the bio-chip;
providing an excitation light;
performing a first detecting step to obtain a first fluorescent signal emitted from the bio-samples, wherein the first detecting step comprises:
adjusting the polarizing element to have a first polarizing angle that is degrees different from a polarizing angle of one of the sub-polarizing units;
providing a depletion light; and
collecting the first fluorescent signal emitted from the bio-samples.

20. The bio-detection method as claimed in claim 19, further comprising:
performing a second detecting step after the first detecting step to obtain a second fluorescent signal emitted from the bio-samples, wherein the second detecting step comprises:
adjusting the polarizing element to have a second polarizing angle that is 90 degrees different from a polarizing angle of another of the sub-polarizing units;
providing the depletion light; and
collecting the second fluorescent signal emitted from the bio-samples; and
repeating the first detecting step and the second detecting step until all designed bioreactions or bioprotocols for the bio-samples on all reaction sites have been detected.

* * * * *